(12) United States Patent
Khan et al.

(10) Patent No.: US 11,596,017 B2
(45) Date of Patent: Feb. 28, 2023

(54) AUTOMATIC BACKOFF OF A SPECTRUM ALLOCATION SERVER HEARTBEAT

(71) Applicant: ARRIS Enterprises LLC, Suwanee, GA (US)

(72) Inventors: Awaiz Khan, Milpitas, CA (US); Ravi Sharma, Santa Clara, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/480,533

(22) Filed: Sep. 21, 2021

(65) Prior Publication Data

US 2022/0007453 A1 Jan. 6, 2022

Related U.S. Application Data

(63) Continuation of application No. 16/797,036, filed on Feb. 21, 2020, now Pat. No. 11,160,133.

(51) Int. Cl.
| | |
|---|---|
| *H04W 76/25* | (2018.01) |
| *H04W 16/14* | (2009.01) |
| *H04L 5/00* | (2006.01) |
| *H04W 72/04* | (2009.01) |
| *H04W 12/06* | (2021.01) |
| *H04W 72/0453* | (2023.01) |

(52) U.S. Cl.
CPC .......... *H04W 76/25* (2018.02); *H04L 5/0082* (2013.01); *H04W 12/06* (2013.01); *H04W 16/14* (2013.01); *H04W 72/0453* (2013.01)

(58) Field of Classification Search
CPC ..... H04W 76/25; H04W 12/06; H04W 16/14; H04W 72/0453; H04L 5/0082
See application file for complete search history.

(56) References Cited

U.S. PATENT DOCUMENTS

| | | | |
|---|---|---|---|
| 2016/0072715 A1* | 3/2016 | Mahadevan | H04L 47/286 370/236 |
| 2018/0376342 A1* | 12/2018 | Macmullan | H04W 24/02 |
| 2021/0058781 A1* | 2/2021 | Lewis | H04W 12/06 |

FOREIGN PATENT DOCUMENTS

CN 107708212 A * 2/2018

* cited by examiner

*Primary Examiner* — Joshua L Schwartz
(74) *Attorney, Agent, or Firm* — Stewart M. Wiener; Steven Stupp

(57) ABSTRACT

During operation, a radio node may provide, at a transmit time during a first time interval, a first instance of a keep-alive message to a computer. Then, the radio node may receive, at a receive time prior to a first instance of a transmit expire time, an instance of a keep-alive response from the computer, where the instance of the keep-alive response authorizes the radio node to transmit in a granted portion of the spectrum until a second instance of the transmit expire time has elapsed. Moreover, the radio node may determine, based at least in part on the receive time and the first instance of the transmit expire time, an updated transmit time. Next, the radio node may provide, at the updated transmit time, which is prior to the second instance of the transmit expire time, a second instance of the keep-alive message addressed to the computer.

20 Claims, 5 Drawing Sheets

AUTOMATIC BACKOFF OF A SPECTRUM ALLOCATION SERVER HEARTBEAT

CROSS REFERENCE TO RELATED APPLICATIONS

This application claims priority under 35 U.S.C. 119(e) to: U.S. Provisional application Ser. No. 16/797,036, "Automatic Backoff of a Spectrum Allocation Server Heartbeat," filed on Feb. 21, 2020, by Khan, et al, the contents of which are herein incorporated by reference.

FIELD

The described embodiments relate to techniques for communicating information among electronic devices. Notably, the described embodiments relate to techniques for dynamically adjusting a transmit time of a heartbeat request to a spectrum allocation server (SAS).

BACKGROUND

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, the shared-license-access band of frequencies near 3.5 GHz (notably, the 150 MHz of bandwidth between 3.55 GHz and 3.7 GHz) is being used for general-purpose communication. This shared-license-access band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the spectrum or bandwidth in the shared-license-access band of frequencies for its use. For example, a radio node may request a grant to reserve a specific 5 MHz block of spectrum from the SAS. If the requested portion of the spectrum is available, the SAS may provide a grant response to the radio node with approval of a grant for the requested portion of the spectrum. Then, the radio node may provide a heartbeat request to the SAS to request authorization to transmit in the granted portion of the spectrum. When the radio node receives a subsequent heartbeat response from the SAS, the radio node is authorized to transmit in the granted portion of the spectrum.

However, the authorization to transmit from the SAS is temporary and needs to be periodically renewed by the radio node (e.g., every 4 min.). If the authorization to transmit is not renewed in time, then the radio node may no longer be able to transmit in the granted portion of the spectrum. Instead, the radio node may need to repeat the grant-request and authorization process with the SAS, which can be time-consuming and can result in degraded service while the granted portion of the spectrum is not available for use.

SUMMARY

A radio node that dynamically adjusts a transmit time of instances of keep-alive messages to a computer is described. This radio node includes: a node or connector; and an interface circuit that communicates with the computer. During operation, the interface circuit provides, at a transmit time during a first time interval corresponding to a first instance of a transmit expire time, a first instance of a keep-alive message addressed to the computer, where a given instance of the keep-alive message requests authorization to transmit in a granted portion of a spectrum. Then, the interface circuit receives, at a receive time prior to the first instance of a transmit expire time, an instance of a keep-alive response associated with the computer, where the instance of the keep-alive response authorizes the radio node to transmit in the granted portion of the spectrum until a second instance of the transmit expire time has elapsed. Moreover, the interface circuit determines, based at least in part on the receive time and the first instance of the transmit expire time, an updated transmit time, where the updated transmit time is temporally offset relative to a transmit time during a second time window corresponding to the second instance of the transmit expire time. Next, the interface circuit provides, at the updated transmit time, which is prior to the second instance of the transmit expire time, a second instance of the keep-alive message addressed to the computer.

Note that the computer may include a SAS. Moreover, the spectrum may be included in a CBRS.

Furthermore, the updated transmit time may be determined based at least in part on a difference between the transmit expire time and the receive time. Additionally, the updated transmit time may be determined based at least in part on the transmit time.

In some embodiments, the updated transmit time may be determined based at least in part on a number of instances of the keep-alive message that were provided until the keep-alive response was received. Alternatively or additionally, the updated transmit time may be determined based at least in part on a previous occurrence in which no instance of the keep-alive response is received prior to a previous instance of the transmit expire time.

Moreover, the updated transmit time may precede a start of the second time interval.

Furthermore, the given instance of the keep-alive message may include a heartbeat request, the keep-alive response may include a heartbeat response, and a given time interval may include a heartbeat interval.

Additionally, the communication with the computer may use wired communication.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
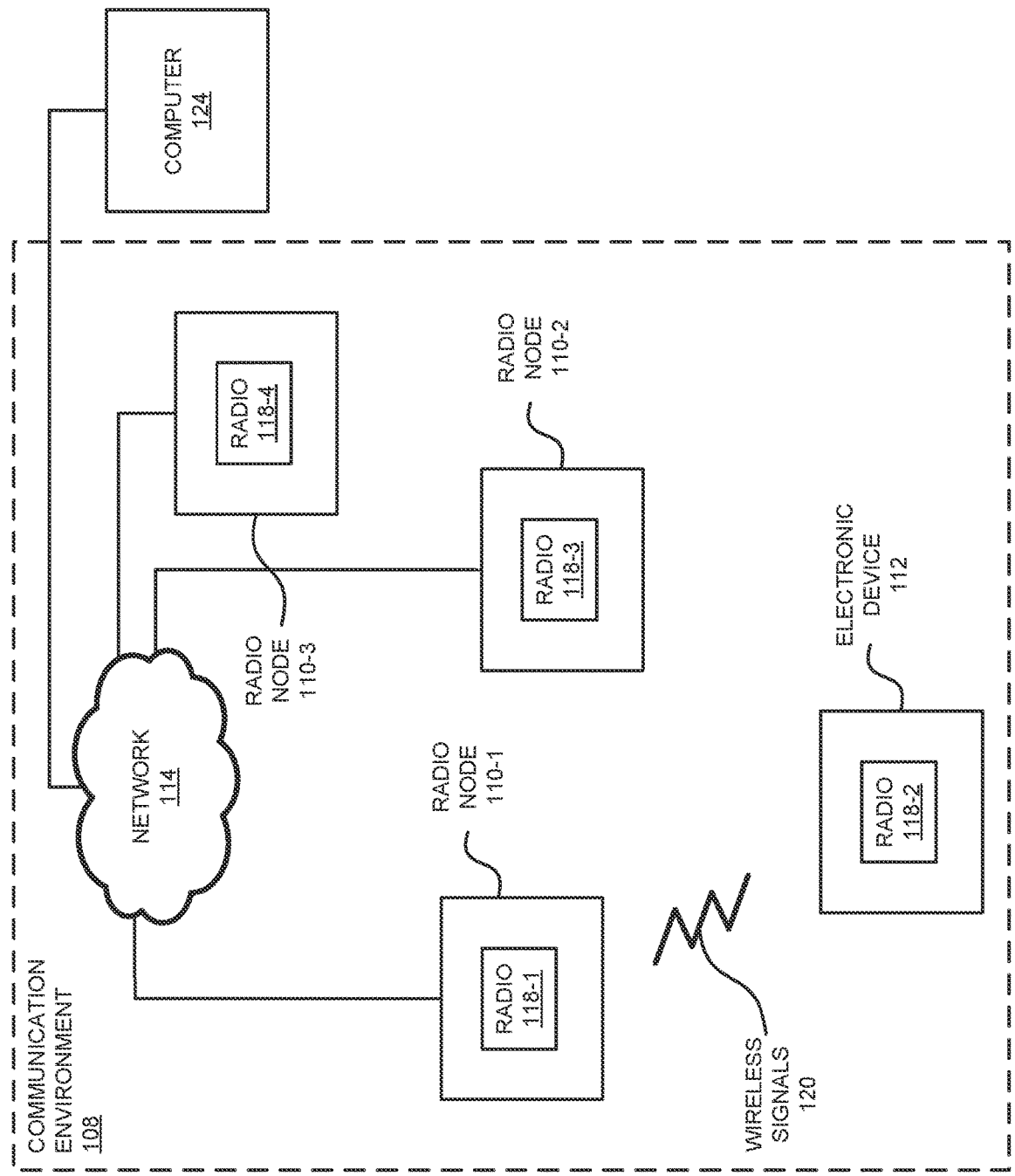
FIG. 1 is a block diagram illustrating an example of communication among a computer, radio nodes and electronic devices in a system in accordance with an embodiment of the present disclosure.

A radio node that dynamically adjusts a transmit time of instances of keep-alive messages to a computer is described. During operation, the radio node may provide, at a transmit time during a first time interval corresponding to a first instance of a transmit expire time, a first instance of a keep-alive message to the computer, where a given instance of the keep-alive message requests authorization to transmit in a granted portion of a spectrum. Then, the radio node may receive, at a receive time prior to the first instance of a transmit expire time, an instance of a keep-alive response from the computer, where the instance of the keep-alive response authorizes the radio node to transmit in the granted portion of the spectrum until a second (subsequent) instance of the transmit expire time has elapsed. Moreover, the radio node may determine, based at least in part on the receive time and the first instance of the transmit expire time, an updated transmit time, where the updated transmit time is temporally offset relative to a transmit time during a second time window corresponding to the second instance of the transmit expire time. Next, the radio node may provide, at the updated transmit time, which is prior to the second instance of the transmit expire time, a second instance of the keep-alive message addressed to the computer.

By dynamically adjusting the transmit time of instances of the keep-alive messages, this communication technique may ensure continuity of communication using the granted portion of the spectrum. For example, by adjusting the transmit time, the communication technique may ensure that the keep-alive responses are received prior to the instances of the transmit expire time, even when there are dynamic or time-varying delays at the computer or in communication with the computer, and/or one or more retries of keep-alive messages (e.g., because of dropped packets). Consequently, the updated transmit time may ensure that there is sufficient temporal margin between an instance of the receive time and an instance of the transmit expire time. Therefore, the communication technique may ensure that the granted portion of the spectrum remains authorized for use by the radio node across multiple instances of the transmit expire time, which may eliminate the need for a subsequent grant request for the portion of the spectrum. Thus, the communication technique may reduce or eliminate time delays, and may ensure improved communication and quality of service in a network that includes the radio node.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'microcell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. As noted previously, a radio node may need to periodically exchange heartbeat messages with a SAS in order to renew a temporary authorization to use a granted portion of a spectrum (such as in the CBRS). If delays in communication with the SAS, delays in processing of a heartbeat request by the SAS and/or multiple heartbeat-request retires are needed (e.g., because of dropped packets or frames), the authorization to transmit may not be renewed in time. When this occurs, a radio node may need to cease its radio-frequency transmission and may change the grant state to suspended. Then, the radio node may need to repeat a grant-request and authorization process with the SAS, which can be time-consuming and can result in degraded service while the granted portion of the spectrum is not available. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS).

Figure 2:
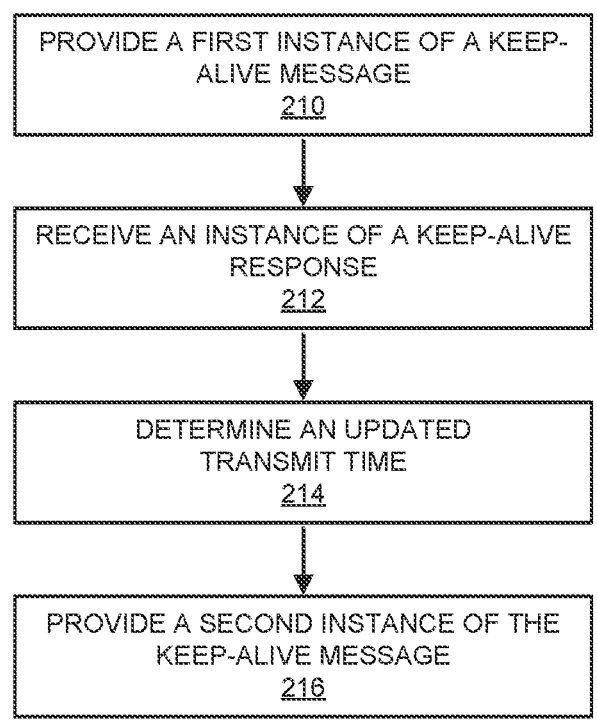
FIG. 2 is a flow diagram illustrating an example of a method for dynamically adjusting a transmit time of an instance of a keep-alive message using a radio node in FIG. 1 in accordance with an embodiment of the present disclosure.

As described further below with reference to FIGS. 2-4, one or more of radio nodes 110 may perform a communication technique by communicating with computer 124 via network 114. Using radio node 110-1 as an example, this radio node may provide a grant request to computer 124 to reserve a portion of a spectrum or bandwidth (such as a portion of the spectrum in a shared-license-access band of frequencies or another band of frequencies) for its use. For example, radio node 110-1 may request a grant to reserve 5, 10, 20, 40, 80, 100 or 150 MHz of spectrum in a particular geographic region in the CBRS from computer 124. In response, computer 124 may provide a grant response to radio node 110-1 with approval of a grant for the requested portion of the spectrum.

Then, radio node 110-1 may request from computer 124 authorization to transmit in the granted portion of the spectrum. For example, radio node 110-1 may provide a first instance of a (periodic) keep-alive message (such as a heartbeat request) to computer 124 in order to request authorization to transmit in the granted portion of the spectrum. Notably, radio node 110-1 may provide the first instance of the keep-alive message at a transmit time during a time interval (such as a start of a heartbeat interval or duration). When radio node 110-1 receives, at a receive time prior to prior to a first instance of a transmit expire time, an instance of a keep-alive response from computer 124, then radio node 110-1 may be authorized to transmit in the granted portion of the spectrum until a subsequent instance of the transmit expire time has elapsed.

However, if there are delays (e.g., in network 114 and/or computer 124), if retries are needed (such as because of dropped packets or frames), or both, a given instance of the keep-alive response may not be received in time (i.e., before a given instance of a transmit expire time). When this occurs, radio node 110-1 may not be allowed to transmit in the granted portion of the spectrum. Instead, radio node 110-1 may need to repeat providing the grant request to computer 124, receiving the grant response from computer 124, providing a given instance of the keep-alive message and receiving a given instance of the keep-alive response before transmitting again in the granted portion of the spectrum. The resulting time delays can degrade communication and quality of service in a network that includes radio node 110-1.

In order to prevent these problems, in the communication technique radio node 110-1 may dynamically adjust the transmit time based at least in part on the receive time and the first instance of transmit expire time. Notably, radio node 110-1 may dynamically adjust or temporally offset the transmit time of a subsequent instance of the keep-alive message based at least in part on a difference between the first instance of transmit expire time and the receive time. For example, when the difference is less than 1, 2 or 5 s, the transmit time of the subsequent instance of the keep-alive message may be temporally offset or reduced (e.g., to before or prior to a start of the time interval, such as by 5, 10 or 30 s) during a time window corresponding to a subsequent instance of the transmit expire time, so that there is more time for communication (including any retries) and processing of a given instance of the keep-alive message. In some embodiments, the transmit time may be dynamically adjusted or temporally offset based at least in part on: the transmit time (which may provide compensation for the time needed for any retries); a number of instances of the keep-alive message that were provided until the keep-alive response was received (which may provide compensation for the time needed for any retries); and/or an previous occurrence in which no instance of the keep-alive response is received prior to a previous instance of the transmit expire time (which may indicate that the current transmit time does not provide sufficient margin to avoid loss of authorization to transmit in the granted portion of the spectrum).

The aforementioned operations in the communication technique may be repeated so that radio node 110-1 can dynamically adapt to changes in communication environment 108. For example, the communication technique may be performed once (such as when radio node 110-1 is turned on), periodically (such as, e.g., every 50 ms), as needed (such as when there are delays in receiving a given instance of the keep-alive response) and/or continuously.

In this way, the communication technique may selectively and dynamically ensure that there is sufficient time for radio node 110-1 to receive a subsequent instance of the keep-alive response. This may ensure that radio node 110-1 remains authorized to transmit in the granted portion of the spectrum. Consequently, the communication technique may reduce or eliminate delays and may improve communication performance.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
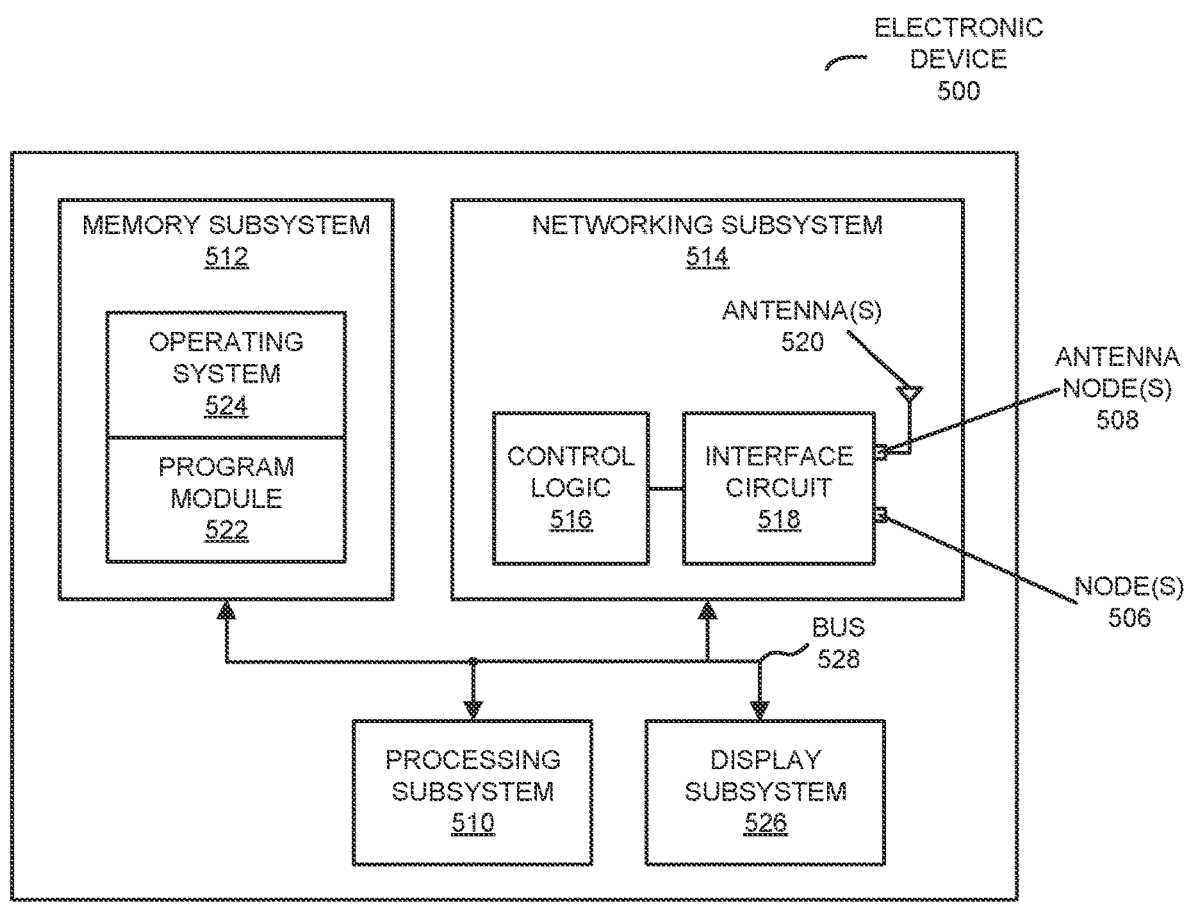
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 120. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for dynamically adjusting a transmit time of an instance of a keep-alive message, which may be performed by a radio node (such as one of radio nodes 110 in FIG. 1). During operation, an interface circuit in the radio node may provide, at a transmit time during a first time interval corresponding to a first instance of a transmit expire time, a first instance of a keep-alive message (operation 210) to a computer, where a given instance of the keep-alive message requests authorization to transmit in a granted portion of a spectrum.

Then, the interface circuit may receive, at a receive time prior to the first instance of a transmit expire time, an instance of a keep-alive response (operation 212) associated with the computer, where the instance of the keep-alive response authorizes the radio node to transmit in the granted portion of the spectrum until a second instance of the transmit expire time has elapsed.

Moreover, the interface circuit may determine, based at least in part on the receive time and the first instance of the transmit expire time, an updated transmit time (operation 214), where the updated transmit time is temporally offset relative to a transmit time during a second time window corresponding to the second instance of the transmit expire time. For example, the updated transmit time may be determined based at least in part on a difference between the transmit expire time and the receive time. Note that the updated transmit time may precede a start of the second time interval.

Next, the interface circuit may provide, at the updated transmit time, which is prior to the second instance of the transmit expire time, a second instance of the keep-alive message (operation 216) addressed to the computer.

Note that the computer may include a SAS. Moreover, the spectrum may be included in the CBRS. For example, the given instance of the keep-alive message may include a heartbeat request, the keep-alive response may include a heartbeat response, and a given time interval may include a heartbeat interval.

Furthermore, the updated transmit time may be determined based at least in part on the transmit time. In some embodiments, the updated transmit time may be determined based at least in part on a number of instances of the keep-alive message that were provided until the keep-alive response was received. Alternatively or additionally, the updated transmit time may be determined based at least in part on a previous occurrence in which no instance of the keep-alive response is received prior to a previous instance of the transmit expire time. Note that the updated transmit time may be determined based at least in part on occurrence of a timeout (such as 10 s) following transmission of a given instance of the keep-alive message, which indicates that a given keep-alive response was not received in time in response to the given keep-alive message.

In some embodiments of method 200, there may be additional or fewer operations. Furthermore, the order of the operations may be changed, and/or two or more operations may be combined into a single operation.

Figure 3:
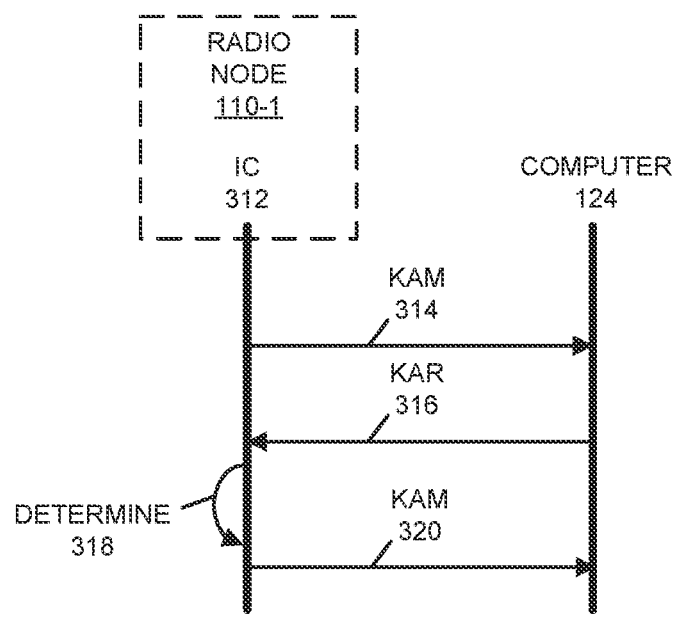
FIG. 3 is a drawing illustrating an example of communication among the electronic devices in FIG. 1 in accordance with an embodiment of the present disclosure.
Figure 4:
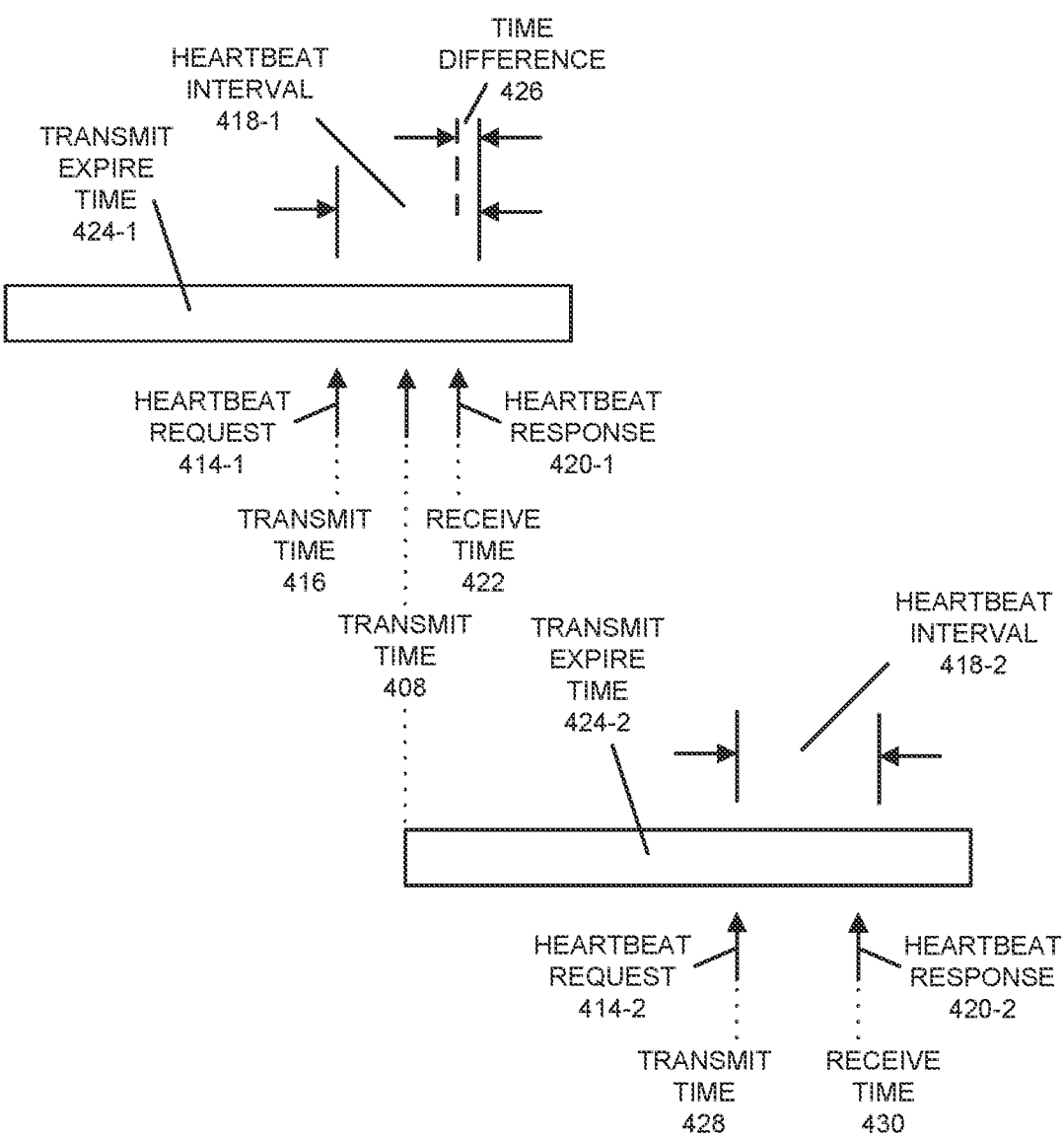
FIG. 4 is a drawing illustrating an example of a technique for dynamically adjusting a transmit time of a heartbeat request to a SAS in accordance with an embodiment of the present disclosure.

Embodiments of the communication technique are further illustrated in FIG. 3, which presents a drawing illustrating an example of communication among radio node 110-1 and computer 124. In FIG. 3, an interface circuit (IC) 312 in radio node 110-1 may provide, at a transmit time during a time interval, a keep-alive message (KAM) 314 to computer 124. In response, computer 124 may provide a keep-alive response (KAR) 316 to radio node 110-1.

Interface circuit 312 may receive, at a receive time prior to a current transmit expire time, keep-alive response 316. Then, interface circuit 312 may determine 318, based at least in part on the receive time and the current instance of the transmit expire time, an updated transmit time. Note that updated transmit time may be temporally offset from or sooner than the transmit time during a time window corresponding to a subsequent transmit expire time.

Subsequently, interface circuit 312 may provide, at updated transmit time, which is prior to a subsequent instance of the transmit expire time, keep-alive message 320 to computer 124.

While FIG. 3 illustrates communication between components using unidirectional or bidirectional communication with lines having single arrows or double arrows, in general the communication in a given operation in this figure may involve unidirectional or bidirectional communication.

In some embodiments of the communication technique, heartbeat messages are used to ensure that a radio node can continue to transmit in a granted portion of a spectrum. Notably, a CBSD may transmit a heartbeat request to a SAS during a heartbeat interval preceding a transmit expire time. For example, the heartbeat request may be transmitted at a start of the heartbeat time. If a heartbeat response is received at the CBSD from the SAS prior to the transmit expire time, then the CBSD may continue transmitting using the granted portion of the spectrum. Thus, two parameters typically specify the timing of the heartbeat messages, the transmit expire time (which is typically 4 min. or 240 s from the time that the heartbeat response was received from the SAS) and the heartbeat interval (which is typically 40 s prior to the transmit expire time, and is usually included in the grant response by the SAS).

In the communication technique, the transmit time of instances of the heartbeat request are dynamically updated in order to ensure sufficient time margin and, thus, the receipt of instances of heartbeat responses before the instances of the transmit expire time. This is illustrated in FIG. 4, which presents a drawing illustrating an example of a technique for dynamically adjusting a transmit time of a heartbeat request from a CBSD to a SAS. Notably, the CBSD may provide to the SAS a heartbeat request 414-1 at transmit time 416 during heartbeat interval 418-1. In response, the SAS may provide a heartbeat response 420-1 to the CBSD at transmit time 408. When the CBSD receives heartbeat response 420-1 at a receive time 422 prior to transmit expire time 424-1, the use of a granted portion (with some or all) of a spectrum may be authorized until a subsequent transmit expire time 424-2 has elapsed or expired. Note that receive time 422 may define the start of the subsequent transmit expire time 424-2.

In the communication technique, when a time difference 426 between transmit expire time 424-1 and receive time 422 is less than a predefined amount (such as 1, 2, 5, or 10 s), the CBSD may update a transmit time 428 of a subsequent heartbeat request 414-2. For example, transmit time 428 may be temporally offset to an earlier time (and, thus, further from an end of transmit expire time 424-2). For example, heartbeat request 414-2 may be transmitted prior to or before heartbeat interval 418-2. This may help ensure that the SAS may provide a heartbeat response 420-2 to the CBSD, which may be received at a receive time 430 prior to transmit expire time 424-2.

By automatically backing off or using a preemptive heartbeat request, the communication technique may help ensure that the CBSD remains authorized to transmit in the granted portion of the spectrum.

In some embodiments, instead of sending a preemptive heartbeat request based at least in part on feedback (such as time difference 426), the CBSD may always send heartbeat requests 414 early (such as prior to heartbeat intervals 418). However, this approach may be inefficient and may lead to increased overhead in the communication between the CBDS and the SAS.

We now describe embodiments of an electronic device, which may perform at least some of the operations in the communication technique. FIG. 5 presents a block diagram illustrating an example of an electronic device 500 in accordance with some embodiments, such as one of radio nodes 110, electronic device 112 computer 124. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism.

Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a pad, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Thus, the communication technique may be implemented at runtime of program module 522. Alternatively or additionally, at least some of the operations in the communication technique may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication technique with CBRS (e.g., a frequency band near 3.5 GHz), in other embodiments of the communication technique different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
   an interface circuit configured to communicate with a computer, wherein the interface circuit is configured to:
   provide, at a transmit time prior to a transmit expire time, a keep-alive message addressed to the computer, wherein the keep-alive message requests authorization to continue transmitting in a granted portion of a spectrum;
   receive, at a receive time prior to the transmit expire time, a keep-alive response associated with the computer, wherein the keep-alive response extends authorization of the radio node to transmit in the granted portion of the spectrum until a subsequent transmit expire time has elapsed;
   update a subsequent transmit time of a subsequent keep-alive message based at least in part on the receive time and the transmit expire time; and
   provide, at the updated subsequent transmit time, which is prior to the subsequent transmit expire time, the subsequent keep-alive message addressed to the computer, wherein the subsequent keep-alive message requests authorization to continue transmitting in the granted portion of the spectrum.

2. The radio node of claim 1, wherein the computer comprises a spectrum allocation server (SAS).

3. The radio node of claim 1, wherein the spectrum comprises a band of frequencies associated with a Citizens Broadband Radio Service (CBRS).

4. The radio node of claim 1, wherein the updated subsequent transmit time is determined based at least in part on a difference between the transmit expire time and the receive time.

5. The radio node of claim 1, wherein the updated subsequent transmit time is determined based at least in part on the transmit time.

6. The radio node of claim 1, wherein the updated subsequent transmit time is determined based at least in part on a number of instances of the keep-alive message that were provided until the keep-alive response was received.

7. The radio node of claim 1, wherein the updated subsequent transmit time is determined based at least in part on a previous occurrence in which no instance of a previous keep-alive response was received prior to a previous transmit expire time.

8. The radio node of claim 1, wherein the subsequent transmit time was scheduled during a time interval prior to the subsequent transmit expire time; and
   wherein the updated subsequent transmit time precedes a start of the time interval.

9. The radio node of claim 1, wherein the keep-alive message or the subsequent keep-alive messages comprises a heartbeat request, the keep-alive response or the subsequent keep-alive response comprises a heartbeat response, and the keep-alive message is provided during a heartbeat interval.

10. The radio node of claim 1, wherein communication with the computer comprises wired communication.

11. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

12. A non-transitory computer-readable storage medium for use in conjunction with a radio node, the computer-readable storage medium storing program instructions that, when executed by the radio node, cause the radio node to perform operations comprising:
   providing, at a transmit time prior to a transmit expire time, a keep-alive message addressed to a computer, wherein the keep-alive message requests authorization to continue transmitting in a granted portion of a spectrum;
   receiving, at a receive time prior to the transmit expire time, a keep-alive response associated with the computer, wherein the keep-alive response extends authorization of the radio node to transmit in the granted portion of the spectrum until a subsequent transmit expire time has elapsed;
   updating a subsequent transmit time of a subsequent keep-alive message based at least in part on the receive time and the transmit expire time; and
   providing, at the updated subsequent transmit time, which is prior to the subsequent transmit expire time, the subsequent keep-alive message addressed to the computer, wherein the subsequent keep-alive message requests authorization to continue transmitting in the granted portion of the spectrum.

13. The non-transitory computer-readable storage medium of claim 12, wherein the computer comprises a spectrum allocation server (SAS) and the spectrum comprises a band of frequencies associated with a Citizens Broadband Radio Service (CBRS).

14. The non-transitory computer-readable storage medium of claim 12, wherein the updated subsequent transmit time is determined based at least in part on a difference between the transmit expire time and the receive time.

15. The non-transitory computer-readable storage medium of claim 12, wherein the updated subsequent transmit time is determined based at least in part on the transmit time.

16. The non-transitory computer-readable storage medium of claim 12, wherein the updated subsequent transmit time is determined based at least in part on a number of instances of the keep-alive message that were provided until the keep-alive response was received.

17. The non-transitory computer-readable storage medium of claim 12, wherein the updated subsequent transmit time is determined based at least in part on a previous occurrence in which no instance of a previous keep-alive response was received prior to a previous transmit expire time.

18. The non-transitory computer-readable storage medium of claim 12, wherein the subsequent transmit time was scheduled during a time interval prior to the subsequent transmit expire time; and
   wherein the updated subsequent transmit time precedes a start of the time interval.

19. A method for updating a subsequent transmit time of a subsequent keep-alive message addressed to a computer, comprising:
   by a radio node:
   providing, at a transmit time prior to a transmit expire time, a keep-alive message addressed to a computer, wherein the keep-alive message requests authorization to continue transmitting in a granted portion of a spectrum;
   receiving, at a receive time prior to the transmit expire time, a keep-alive response associated with the computer, wherein the keep-alive response extends authorization of the radio node to transmit in the granted portion of the spectrum until a subsequent transmit expire time has elapsed;
   updating the subsequent transmit time of the subsequent keep-alive message based at least in part on the receive time and the transmit expire time; and
   providing, at the updated subsequent transmit time, which is prior to the subsequent transmit expire time, the subsequent keep-alive message addressed to the computer, wherein the subsequent keep-alive message requests authorization to continue transmitting in the granted portion of the spectrum.

20. The method of claim 19, wherein the computer comprises a spectrum allocation server (SAS) and the spectrum comprises a band of frequencies associated with a Citizens Broadband Radio Service (CBRS).

* * * * *